Sept. 22, 1942.    L. G. RAMBIN    2,296,571
NAME COINER
Filed Sept. 2, 1941

Louis G. Rambin
INVENTOR

BY Victor J. Evans & Co.
ATTORNEYS

Patented Sept. 22, 1942

2,296,571

UNITED STATES PATENT OFFICE 2,296,571

NAME COINER

Louis G. Rambin, Overton, Tex., assignor of one-third to J. I. Roberts, Shreveport, La.

Application September 2, 1941, Serial No. 409,299

1 Claim. (Cl. 35—1)

This invention relates to a name coiner and has for an object to provide a device for effecting the coining of a name for use primarily in contest name coining although it may be used as an educational entertaining game for competing in originating names, and for other uses.

A further object is to provide a device of this character consisting primarily of a board displaying a chart of words in a vertical row in combination with a ribbon passed loosely through transverse slots in the board so as to be pulled endwise from either end vertically or shifted horizontally across the board, the ribbon displaying letters and syllables which may be used as prefixes, syllables, or suffixes relatively to the words and syllables of the chart by merely shifting the ribbon to change the sound or the meaning or both of a word on the chart and thus coin a new name.

A further object is to provide a device of this character which may be used to coin names in name contests by merely changing the printing on the board to fit the particular type or character of the contest in which a coined name offers the solution.

A further object is to provide a device of this character which will be formed of a few, simple parts, which will be inexpensive to manufacture.

With the above and other objects in view, the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification:

Figure 1:
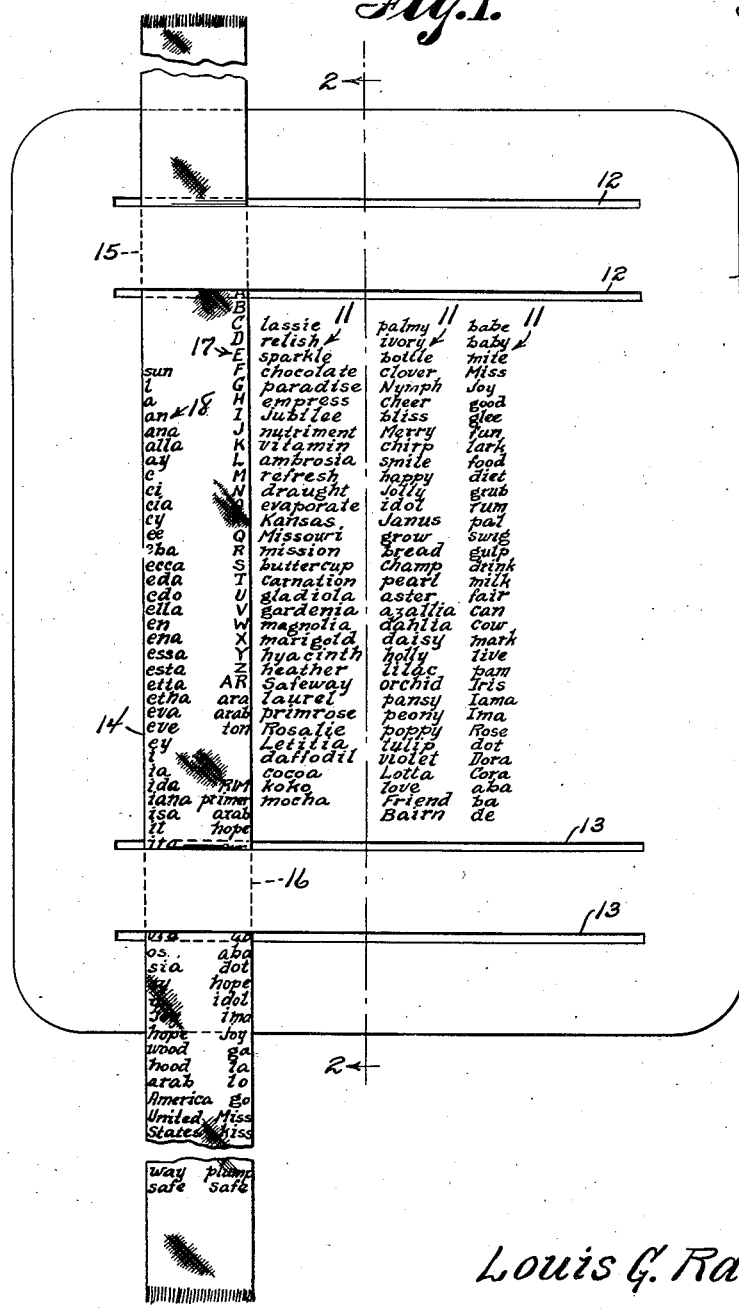
Figure 1 is a front elevation of a name coiner constructed in accordance with the invention.

Referring now to the drawing in which like characters of reference designate similar parts in the various views, 10 designates a board or card, formed of any suitable material, and of substantially oblong outline. The card is provided with vertical columns 11 of words, and of syllables, see Figure 1. Above and below the columns the card is provided with pairs of parallel slots 12 and 13 respectively and the slots are of greater length than the combined width of the columns of words and syllables.

Figure 2:
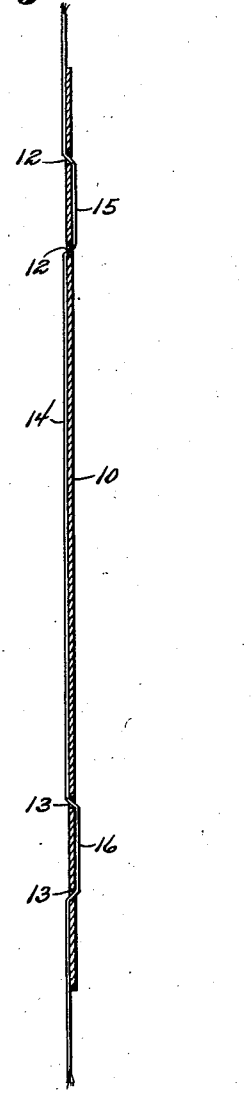
Figure 2 is a longitudinal sectional view taken on the line 2—2 of Figure 1.

A flexible ribbon 14 is threaded through the upper and lower slots as shown at 15 and 16 respectively, see Figure 2, so that the ribbon extends over that portion of the card bearing the columns of words and syllables. The ribbon bears a vertical column 17 of prefixes and a vertical column 18 of suffixes. The ribbon is adjustable upwardly or downwardly or laterally with relation to the card 10 to arrange any prefix or suffix carried thereby in desired relation to one of the words or any portion of the words or syllables of the columns 11.

For example, if the word selected to be modified is "ambrosia," which may be found as the ninth word in column one, the ribbon may be shifted vertically until the prefix "L" registers with the word and the resulting coined word is "Lambrosia." In like manner if a word is to be coined using the word "chocolate" which may be found as the fourth word in the first column by shifting the ribbon 14 longitudinally and transversely of the card until the syllable "ita" which may be found as the twenty-seventh syllable in the suffix column 18, is disposed over the last syllable "ate" of chocolate the resultant coined word will be "chocolita."

From the above description it is thought the construction and operation of the invention will be fully understood without further explanation.

What is claimed is:

A name coiner comprising a card having vertical columns of words and provided below and above the words with pairs of horizontal slots greater in length than the combined widths of the columns, a ribbon threaded through the upper and lower slots of the card and extending over the face of that portion of the card bearing the columns of words, said ribbon bearing vertical columns of prefixes and suffixes, said ribbon being adjustable upwardly, downwardly or laterally with relation to the card to arrange any prefix or suffix carried thereby in proper relation to one of the words of the card.

LOUIS G. RAMBIN.